R. D. MARKHAM.
SHORT CIRCUITING LOCKING DEVICE FOR AUTOMOBILES.
APPLICATION FILED MAY 24, 1909.
988,479.
Patented Apr. 4, 1911.
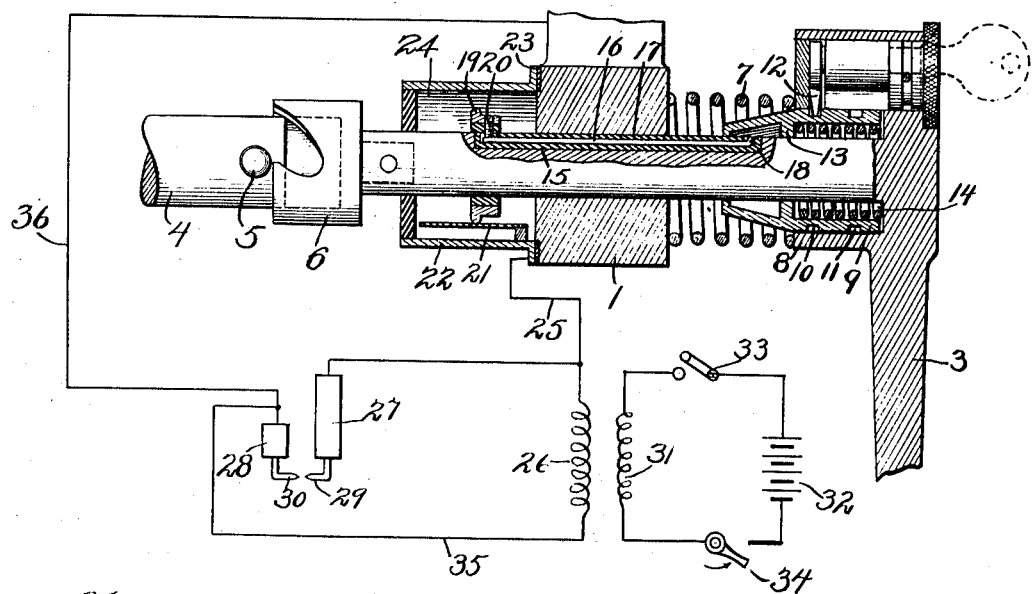
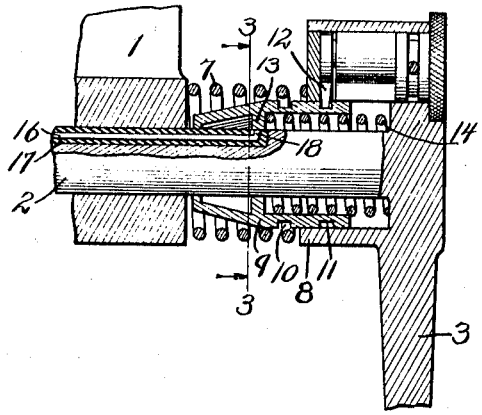
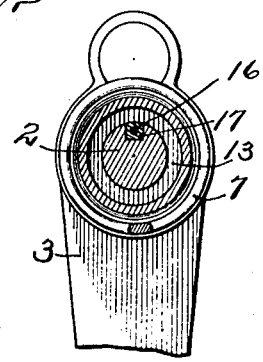
Witnesses:
A. Knight
U. P. Kilroy
Inventor:
R. D. Markham
By Brown & Hopkins
Attys

UNITED STATES PATENT OFFICE.

ROMONDO D. MARKHAM, OF CHICAGO, ILLINOIS.

SHORT-CIRCUITING LOCKING DEVICE FOR AUTOMOBILES.

988,479.	Specification of Letters Patent.	Patented Apr. 4, 1911.

Application filed May 24, 1909. Serial No. 497,834.

*To all whom it may concern:*

Be it known that I, ROMONDO D. MARKHAM, a citizen of the United States, residing at Chicago, in the county of Cook and State of Illinois, have invented certain new and useful Improvements in Short-Circuiting Locking Devices for Automobiles, of which the following is a specification.

This invention relates generally to improvements for locking automobiles against being operated by those not having ownership or the right to run the same.

According to the usual construction of automobiles and the like, the machine is provided with a starting element or crank mounted upon the longitudinally movable shaft, said shaft being adapted to be brought into operative relation with the engine shaft by means of clutch elements or members mounted respectively on the adjacent ends of said shafts.

In my co-pending application, Serial No. 483,120, filed March 13, 1909, I have disclosed a starting crank or element which is provided with means for locking it against being moved into rotative engagement with the shaft of the motor or other rotary part by which the motor may be started.

The object of the present invention is to provide improved means to prevent the unauthorized operation of the machine by making it impossible to operate the sparking device when the parts are locked in inoperative position.

With a view to the attainment of these ends the invention consists in novel features of construction and arrangement which will now be described in connection with the drawings forming a part of the specification, and in which—

Figure 1 is a vertical section through the starting element and a diagram showing the electrical circuits employed in this construction, the parts being shown in their proper positions for running the automobile. Fig. 2 is a sectional view of part of the mechanism shown in Fig. 1. Fig. 3 is a section on the line III—III of Fig. 2.

Referring more particularly to the drawings, a guide or support 1 rigid with the frame of the automobile serves to slidably support the shank or stem 2 of the starting element or crank 3 of the automobile. Upon the inner end of said shank 2 is provided a clutch member, preferably a notched collar 6 adapted to engage radial pins 5 on the outer end of the engine shaft 4. A spring 7 positioned between the end face of the guide or support 1 and a head 8 of the crank 3 serves to impart to said crank a normal tendency outward, thus, preventing engagement between the clutch members 5 and 6 on the ends of the shafts 2 and 4.

The mechanism thus far described is entirely similar to that found on automobiles as usually constructed, and is adapted to start the engine of an automobile in the usual manner by exerting pressure upon the crank 3 while turning said crank, which moves the shank 2 into operative engagement with the engine shaft 4. Slidably mounted upon the shank 2 of the starting element is a sleeve 9, comprising cylindrical and conical portions, as shown, the cylindrical portion of said sleeve being provided with circular locking grooves 10 and 11, into which the bolt or latch 12 of a suitable lock is adapted to engage successively. Said sleeve 9 is interiorly hollowed and provided intermediately of the cylindrical and conical portions with an annular projection 13 for a purpose to be hereinafter referred to. Within the annular recess thus formed between the shank 2 and the cylindrical portion of the sleeve 9 is mounted a coil spring 14 of such size as to be maintained out of contact with the shank 2 for a purpose which will hereinafter appear. Said spring 14 serves to force the collar 9 outwardly from the recessed head 8 of the crank 3 when the bolt 12 of the lock is moved out of engagement with the grooves 10 or 11. The sleeve 9 is thus adapted to be maintained in either an inner or an outer position with respect to the recessed head 8. The shank 2 is provided longitudinally with a groove 15 within which a wire conductor 16 is embedded in some suitable insulating material 17, which effectually insulates said wire from contact with the shank 2 and the guide 1 of the frame. The outer end 18 of the wire conductor 16 is bent outwardly and conforms exactly to the journal surface of the shaft 2, thus forming a contact adapted to coöperate with the collar 13 of the sleeve 9. At the other end of said conductor 16 is mounted a collar 19, which is maintained in electric connection with the wire 16 by means of a grub screw 20, whose inner end impinges wire 16. The grub screw 20 and the collar 19 are thoroughly insulated from the shaft 2. Upon the periphery of the collar 19 slides a spring contact 21 which is mounted upon the inner wall of the cylindrical housing 22, said housing being attached to the inner face of the guide or support 1, but separated therefrom by a layer of insulation 23. Closing the outer end of the housing 22 is an insulator washer 24 which fits closely about the shaft 2, thus inclosing the contacts 19 and 21 just referred to. Electrically connected with the housing 22 and consequently with the contact finger 21, is a wire 25 which leads to a secondary coil 26 of a sparking device, said sparking device comprising sparking plugs 27 and 28 provided with sparking contacts 29, 30. For inducing currents in the secondary 26, the primary coil 31 is positioned adjacently to said secondary coil 26 and connected up in circuit with the battery 32, switch 33 and the circuit making and breaking device 34.

Connecting the secondary coil 26 with the sparking plug 28 is a conductor 35. The sparking plug 28 is electrically connected in any suitable manner with the guide 1, this connection usually being by way of the frame work of the machine, but for the sake of clearness is shown on the drawings as a conductor 36. The sleeve 9 being always in electric connection with the guide 1 by way of the shaft 2, it will be evident that whenever the end 18 of the conductor 16 is brought into rotary engagement with the annular projection 13 of the collar 9, the secondary coil 26 will be short-circuited through guide 1, shaft 2, collar 9, conductor 16, collar 19, spring contact 21, conductor 25, and wires 35 and 36. It will thus be seen that in this condition it will be impossible to create a spark between the contacts 29, 30 of the plug 27, and plug 28. The position of the collar 9 under these conditions is shown in Fig. 2 of the drawings, from which it will be noticed that the latch 12 of the lock engages the outer groove 11 of the sleeve 9, said sleeve being thus locked in its outer position, in which position it forms an abutment preventing the shaft 2 of the starting element being moved into operative engagement with the engine shaft 4. It is thus made impossible to start the engine, not only by the usual cranking means, but it furthermore becomes impossible to establish the usual sparking circuits. As a result it will be impossible to effect the starting of the engine by operating the running gear until the first explosion in the cylinder has taken place, as would be possible were the sparking device not short-circuited.

It is evident that various alterations in the construction and arrangement of the elements shown and described in the specification and drawings may be incorporated in a device of this nature without departing from the broad spirit of my invention, and I do not therefore wish to be confined to the specific embodiment disclosed herein.

What I claim is:—

1. In a device of the character described, the combination with a sparking device comprising an electric circuit therefor, of a cranking device, a conductor insulated in the cranking device for short-circuiting said sparking device, and means carried by the cranking device for throwing said conductor into and out of short circuiting connection with said sparking device.

2. In a device of the character described, the combination with a sparking device comprising primary and secondary circuits, of a cranking device, a conductor insulated within said cranking device, and means carried by the cranking device for throwing said conductor into and out of short circuiting connection with one of said circuits.

3. In a device of the character described, the combination with a sparking device comprising primary and secondary circuits, of a cranking device, a conductor mounted within said cranking device, said conductor being insulated therefrom, and means mounted on the cranking device for connecting up said conductor in short circuiting connection with said secondary circuit.

4. In a device of the nature described, the combination with a sparking plug, a secondary coil, a primary coil, one of said coils being in electric circuit with the sparking plug, an open shunt in electrical connection with one of said coils, a cranking shaft movable longitudinally on its own axis, and means connected with said cranking shaft for closing said shunt, said means being operable by the longitudinal movement of said cranking shaft to render the sparking plug inoperative when the shunt is closed.

5. In a device of the nature described, the combination with a sparking coil, of an electrical circuit including said coil, means for successively energizing and deënergizing said circuit, a shunt circuit connected with said circuit, an engine shaft, and a crank shaft movable into and out of cranking relation to said engine shaft, said cranking shaft being provided with means for completing the shunt circuit through the said coil.

6. In a short-circuiting locking device for automobile engines, the combination of an engine shaft, a cranking shaft movable axially into and out of driving engagement with said engine shaft, a sparking device having a short-circuiting shunt through said cranking shaft, and means for making and breaking said shunt circuit.

7. In a device of the nature described, the combination with the engine shaft and the cranking shaft movable longitudinally into and out of operative engagement with said engine shaft, of a sparking coil having a short-circuiting shunt, means for locking said cranking shaft out of engagement with the engine shaft, and means coöperating with said locking means for making and breaking said short-circuiting shunt.

8. In a device of the character described, an engine shaft, a crank-shaft movable longitudinally to rotatably engage said engine shaft, means adjustable on the crank shaft for locking it against rotatable engagement with the engine shaft, a sparking device electrically connected with said locking means, and means connected with said locking means for short-circuiting the sparking device.

9. In a device of the character described, the combination with a sparking coil, and an energizing circuit therefor, of a shunt circuit for short-circuiting said sparking coil, a cranking shaft, and means carried by said shaft for closing and opening said short circuiting shunt circuit.

10. In a device of the character described, the combination with the sparking coil and means for energizing the same, of an engine shaft, a cranking shaft movable longitudinally into and out of cranking engagement with the engine shaft, said cranking shaft being provided with an insulated conductor, a short-circuiting circuit for said sparking coil including said insulated conductor, and a sleeve slidable on the cranking shaft and adapted to make and break said short-circuiting circuit.

11. In a device of the character described, the combination with an engine and a cranking shaft reciprocable into and out of operative relation with the engine shaft, an insulated conductor carried by said cranking shaft, a sleeve slidable on the cranking shaft and adapted to be locked in two positions, said positions corresponding respectively to operative and non-operative positions with respect to said engine shaft, sparking contacts normally in circuit with a sparking circuit, one of said contacts being in electrical connection with the cranking shaft and the other with the insulated conductor carried thereby, and means connected with said sleeve for electrically connecting the cranking shaft and insulated conductor when the said cranking shaft is locked in non-operative position.

12. In a device of the character described, the combination with an engine shaft, of a starting element movable axially into and out of rotatable engagement with said engine shaft, a guide for said starting element, rotatable locking means interengaging between said guide and starting element to rotatably hold the starting element against axial movement, and a sparking device provided with a short circuiting connection through said rotatable locking device.

In testimony whereof I have signed my name to this specification, in the presence of two subscribing witnesses, on this 20th day of May, A. D. 1909.

ROMONDO D. MARKHAM.

Witnesses:
CHAS. H. SEEM,
FRANCIS A. HOPKINS.